Sept. 20, 1971 W. A. MARTIN 3,606,185
NON-REWIND CARTRIDGE FOR ROLL OF STRIP MATERIAL
Filed Feb. 13, 1970 5 Sheets-Sheet 1
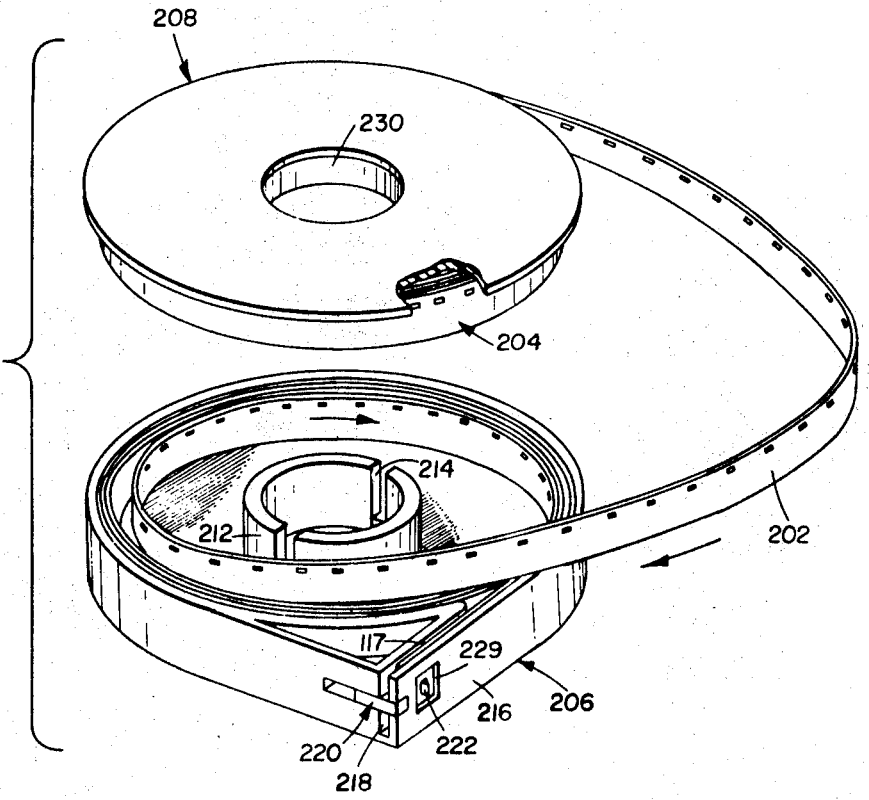
FIG. 1
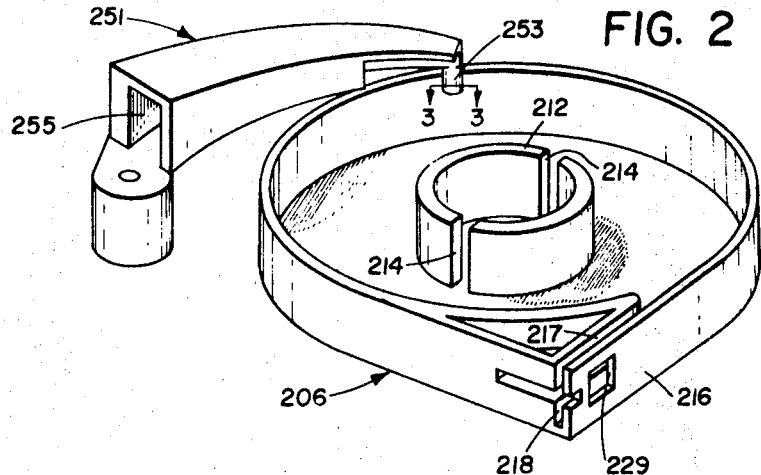
FIG. 2
FIG. 3
PRECEDING CONVOLUTION
SUCCEEDING CONVOLUTION
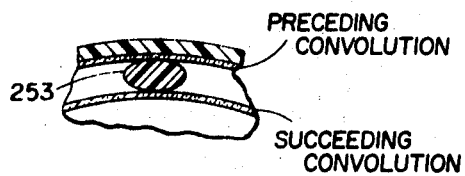
WILLIAM A. MARTIN
INVENTOR.
BY
ATTORNEYS

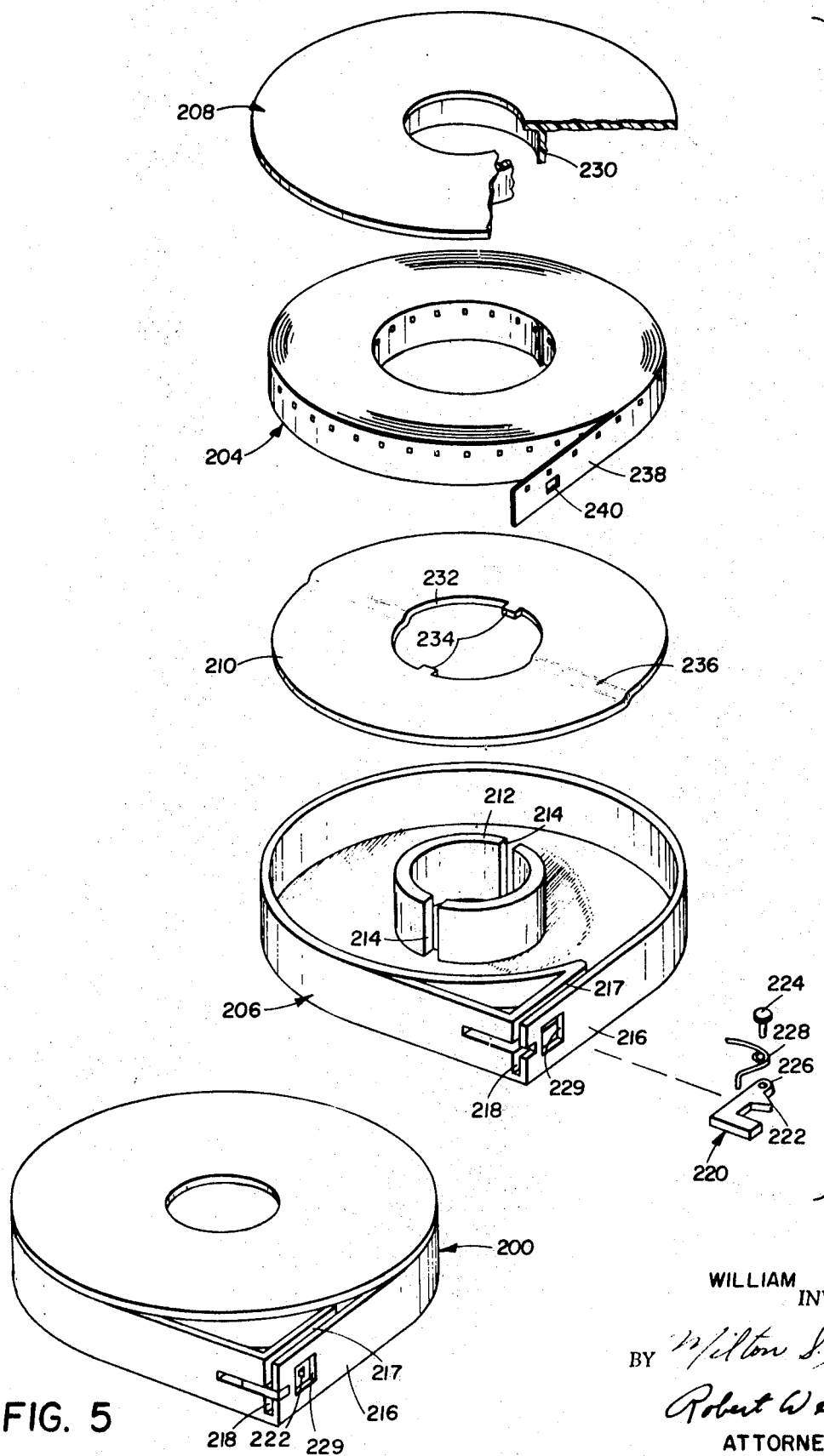

Sept. 20, 1971 W. A. MARTIN 3,606,185
NON-REWIND CARTRIDGE FOR ROLL OF STRIP MATERIAL
Filed Feb. 13, 1970 5 Sheets-Sheet 3

WILLIAM A. MARTIN
INVENTOR.

BY Milton S. Sales
Robert W. Hampton
ATTORNEYS

Sept. 20, 1971  W. A. MARTIN  3,606,185
NON-REWIND CARTRIDGE FOR ROLL OF STRIP MATERIAL
Filed Feb. 13, 1970  5 Sheets-Sheet 4

WILLIAM A. MARTIN
INVENTOR.

BY *Milton S. Sales*
*Robert W. Hampton*
ATTORNEYS

Sept. 20, 1971 W. A. MARTIN 3,606,185
NON-REWIND CARTRIDGE FOR ROLL OF STRIP MATERIAL
Filed Feb. 13, 1970 5 Sheets-Sheet 5
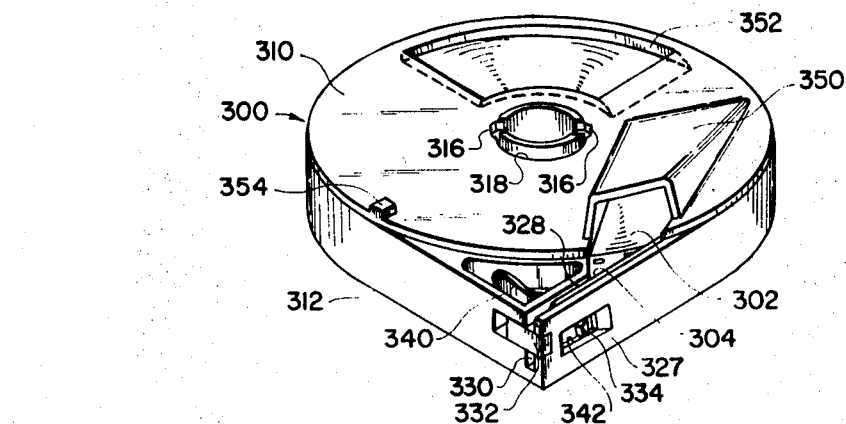
FIG.14
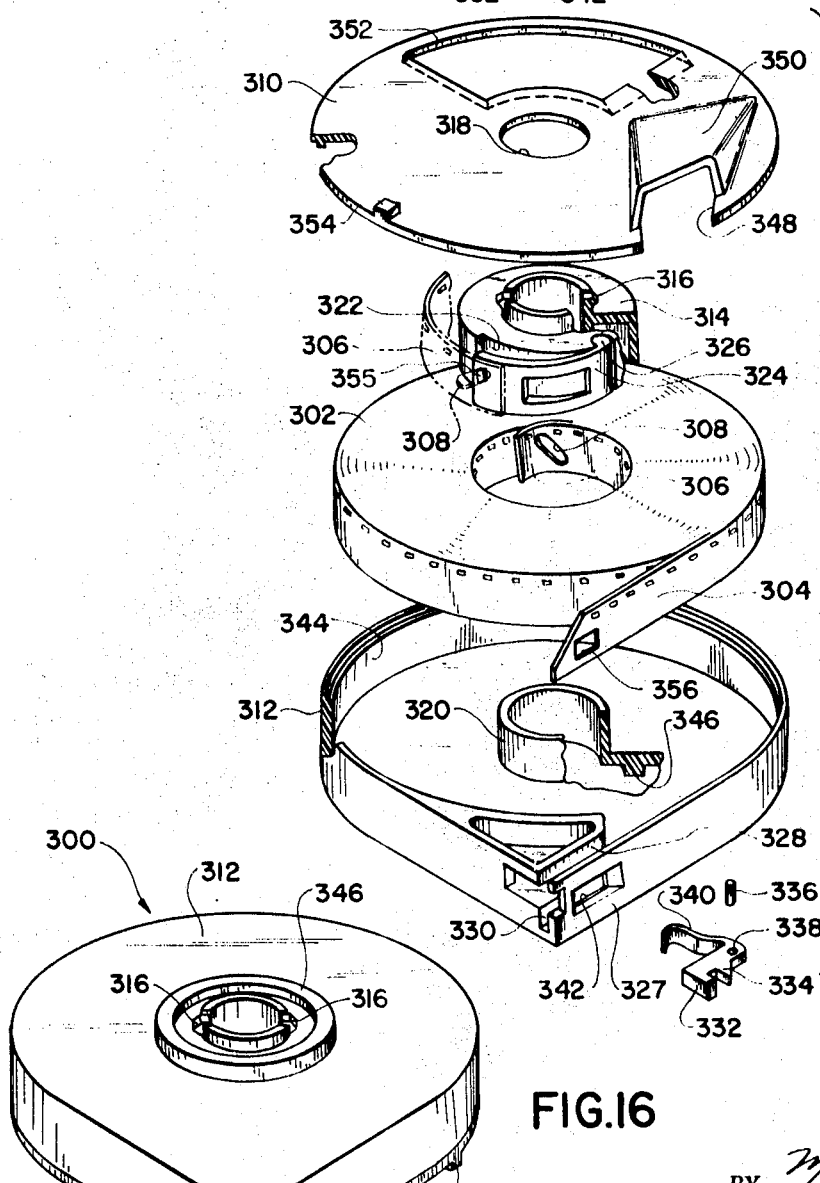
FIG.15
FIG.16
WILLIAM A. MARTIN
INVENTOR.
BY 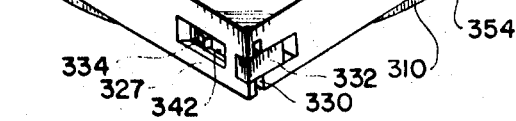
ATTORNEYS United States Patent Office 3,606,185
Patented Sept. 20, 1971

3,606,185
NON-REWIND CARTRIDGE FOR ROLL
OF STRIP MATERIAL
William A. Martin, Fairport, N.Y., assignor to
Eastman Kodak Company, Rochester, N.Y.
Continuation-in-part of application Ser. No. 659,938,
Aug. 11, 1967. This application Feb. 13, 1970,
Ser. No. 11,268
Int. Cl. B65h 17/48
U.S. Cl. 242—55.21                                15 Claims

ABSTRACT OF THE DISCLOSURE

A non-rewind cartridge for use on an apparatus, such as film or tape projector, wherein a rotatable holder winds up entering strip material from the periphery of the holder inwardly so that the lead portion of the strip material is outermost; and the roll of strip material is also disposed in supply form in the same cartridge.

CROSS-REFRENCE TO RELATED APPLICATION

This is a continuation-in-part of application Ser. No. 659,938, filed Aug. 11, 1967, and now abandoned.

BACKGROUND OF THE INVENTION

Field of the invention

The present invention is directed to cartridges for holding rolls of strip material, such as projector cartridges that contain rolls of strip material such as filmstrip, magnetic tape and the like; and is particularly directed to a cartridge that is an integral, self-contained package arranged to hold a roll of strip material in supply form for use in an apparatus and to also hold the strip material in take-up form as the strip material is returned to the cartridge from the apparatus upon which the cartridge is being used; and still more particularly is directed to a cartridge that requires no rewind of the strip material so that the take-up roll of strip material becomes the supply roll ready for operation again.

Description of the prior art

In order to eliminate the necessity of rewinding rolls of strip material so that the lead portion of a roll will be radially outwardly of the roll ready for use on an apparatus, the prior art has disclosed various arrangements for accomplishing this desirable results. Some of these arrangement have been so elaborate that they are commercially impractical. Some arrangements involve taking the lead portion from the inside of the roll and eventually returning the lead portion to the outside of the same roll; another arrangement involves taking the lead portion from the inside of the roll mounted at one end of an apparatus and eventually returning the lead portion to another end of the apparatus whereupon the lead portion forms the innermost convolution of a second roll and the successive convolutions that follow are formed radially outwardly of the innermost convolution, with the further consequence that the second roll must be transferred back to the one end of the apparatus before the roll may be ready for use again on such apparatus.

In U.S. Pat. No. 1,119,489, the patentee, Bingham, disclosed still another arrangement to obviate the necessity of rewinding film by feeding the film from a supply receptacle at one end of an apparatus to a receiver at another end of the apparatus, and coiling the film in the receiver with the leading end of the film outermost. Bingham used the film advancing mechansm of the apparatus to advance the film from the supportng receptacle, through the apparatus, and then to te receiver, and further provided a twisted tubular member that served to guide the film into the receiver. The film passed through the tubular member which was curved so as to impart to the issuing end of the film a proper curvature to asssit in the coiling action of the film in the receiver. The receiver and the tubular guiding member were movably supported relative to each other so that as the roll of film in the receiver increased in size, either the receiver or the guide would move so as to feed the film toward the center of the receiver. The film, as driven by the apparatus advancing mechanism, passed through the tubular guide member and as the leading end of the film issued from the guide member, the end came into contact with the wall of the receiver. This contact of the film lead end caused the receiver, which was freely rotatable, to rotate; thus, the film imparted rotation to the receiver and was automatically coiled from the periphery of the receiver inward toward the center of such receiver. After the film was completely coiled in the receiver, the film was removed from the receiver at the end of the apparatus and placed again in the supporting receptacle at the other end of the apparatus. Bingham disclosed an improvement of this arrangement in U.S. Pat. No. 1,134,664 but employing similar principles of operation.

In U.S. Pat. No. 2,085,439, the patentee, Morlock disclosed another arrangement that accomplished the same results as Bingham, and further disclosed a pivotal guide arm through which the film was guided into a container. The container was caused to rotate by the film lead end coming into engagement with an abutment on the inner periphery of the container with the result that the film wound itself into a coil in an internal direction, or in other words, from the periphery inwardly toward the center of the container so that the film lead portion would be outermost, as was the case in the Bingham patented disclosures. Once the film was in the container, which was located at one end of the apparatus, the roll of film had to be transferred back to the supply position at the other end of the apparatus, as was also the case in the Bingham disclosures.

SUMMARY OF THE INVENTION

An object of the present invention is to overcome the disadvantages of the Bingham and Morlock patented disclosures, wherein it was necessary to transfer the take-up roll of film from one end of the apparatus to the supply location at the other end before being able to re-project the film, by providing a non-rewind cartridge that is an integral self-contained package adapted to be mounted on an apparatus and from which strip material is advanced from a supply roll in the cartridge through the apparatus and in return to a take-up position in the same cartridge with the lead portion of the strip material being outermost ready for use again without rewinding.

In an alternate arrangement, a further object is to provide a cartridge arrangement wherein the supply and take-up portions of the roll of the strip material are concentrically disposed relative to each other.

Other objects of the invention will become apparent to those skilled in the art to which this invention pertains from the drawings and the description of the drawings that follow.

BRIEF DESCRIPTION OF THE DRAWINGS

In the detailed description of the preferred embodiments of the invention presented below, reference is made to the accompanying drawings, in which:

FIG. 1 is a partially exploded perspective view of a cartridge employing the concept of the invention and illustrating the path of the strip material from the supply portion to the take-up portion of the cartridge;

FIG. 2 is a perspective view of the rotatable cup or holder of the cartridge and illustrating the pivotal guide arm;

FIG. 3 is a cross-sectional view of the guide pin on the guide arm taken along line 3—3 of FIG. 2 and further showing a portion of a preceding convolution of strip material as it passes radially outwardly of the guide pin, and a portion of the incoming convolution as it passes radially inwardly of the guide pin from the guide channel or chute of the guide arm;

FIG. 4 is a fully exploded perspective view of the cartridge shown in FIG. 1;

FIG. 5 is a perspective view of the cartridge in assembled relationship;

FIG. 14 is a perspective view of another embodiment of the cartridge;

FIG. 15 is a partially exploded perspective view of the cartridge of FIG. 14 and a roll of film carried thereby; and FIG. 16 is a perspective view of the bottom of the cartridge of FIG. 14.

DESCRIPTION OF THE PREFERRED EMBODIMENTS

Figure 6:
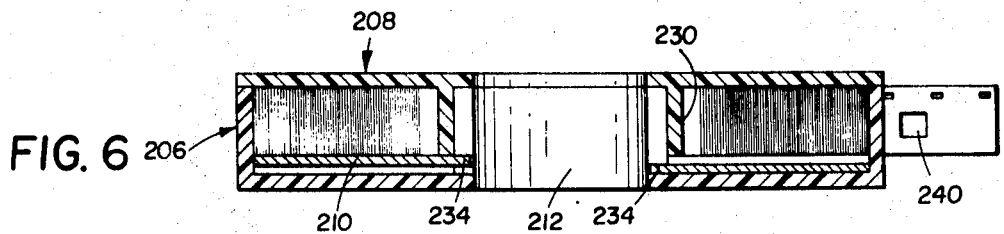
FIGS. 6 through 10 are cross-sectional views of the cartridge and illustrating the sequence of positions taken during operation while in an apparatus.

In reference to the drawings, cartridges are disclosed that may be used with apparatus (not shown) such as a movie projector or a tape recorder; thus, the strip material used in such cartridges may be film, magnetic tape or the like.

The projector cartridge 200 is shown in FIG. 1 in partly exploded relationship to illustrate the path taken by the strip material 202 from the roll 204 of strip material in supply form to the freely rotatable cup or holder 206.

In reference to FIG. 4 which shows the projector cartridge 200 completely in exploded relationship, the cartridge may have concentric telescoping components such as top plate 208, retaining plate 210 and the aforementioned freely rotatable cup or holder 206. The cartridge, in collapsed relationship, has the appearance illustrated in FIG. 5.

The rotatable cup or holder 206 has an integrally formed hub 212 that is provided with axially extending slots 214; a tangential extension 216 defining a passageway 217 leading to the exit slot 218; and a pivotally mounted spring-biased stop member 220. The stop member has a lug 222, and is pivotally mounted in the passageway 217 by means of the pin 224 and pin recess 226. The stop member is biased in counterclockwise direction, as viewed in FIG. 4, by the spring 228 so that lug 222 will extend through aperture 229 across the passageway.

The top plate has an integrally formed hub 230 that seats within the center of the strip material roll 204 and over hub 212 of the cup 206 when the components of the cartridge are in collapsed relationship.

The retaining plate 210 has a central aperture 232 and guide lugs 234 that extend radially inwardly of the plate into the aperture for sliding cooperative relationship with the axially extending slots 214 in hub 212 of the cup. The retaining plate may also have part of its surface offset from the other part of the surface, as shown by the crimp in the plate indicated at 236, for a purpose to be described later.

It should be apparent from the description thus far that the projector cartridge 200 may be simply constructed, and may be readily made from molded plastic or other suitable materials.

In operating the projector cartridge 200, the roll of strip material has a lead portion 238 which in turn has an enlarged perforation 240 that is releasably engaged by the lug 222 of the stop member 220 to hold the lead portion within the passageway 217 in tangential extension 216 of the cartridge.

The cartridge 200 may be easily mounted on a spindle 242 of an apparatus (not shown). A conventional puck drive (not shown) of the apparatus may extend through the aperture 229 of the cartridge tangential extension to pivot the stop member 220 in a clockwise direction, as viewed in FIG. 4, and thus, release the lug 222 of the stop member from the enlarged perforation 240 of the strip material lead portion 238, whereupon the lead portion is driven out of the exit slot 218 of the cartridge.

Although apparatus is not specifically shown for use with the cartridge of this invention, it will be appreciated that it is well known to provide a suitable guide path in projectors and similar apparatus for strip material until such time as the strip material advancing mechanism (not shown) of the apparatus engages the strip material for subsequent advancement past a sound head or film gate, or whatever the operating station may be. When such advancing mechanism does so engage the strip material, the puck drive would be retracted from its driving engagement with the strip material through aperture 229 of the cartridge tangential extension 216.

Figure 11:
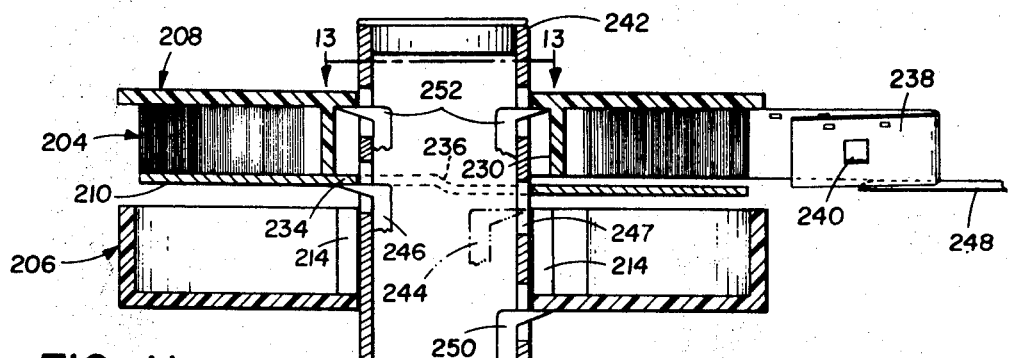
FIG. 11 is a cross-sectional view of a cartridge mounted on a spindle of an apparatus.
Figure 12:
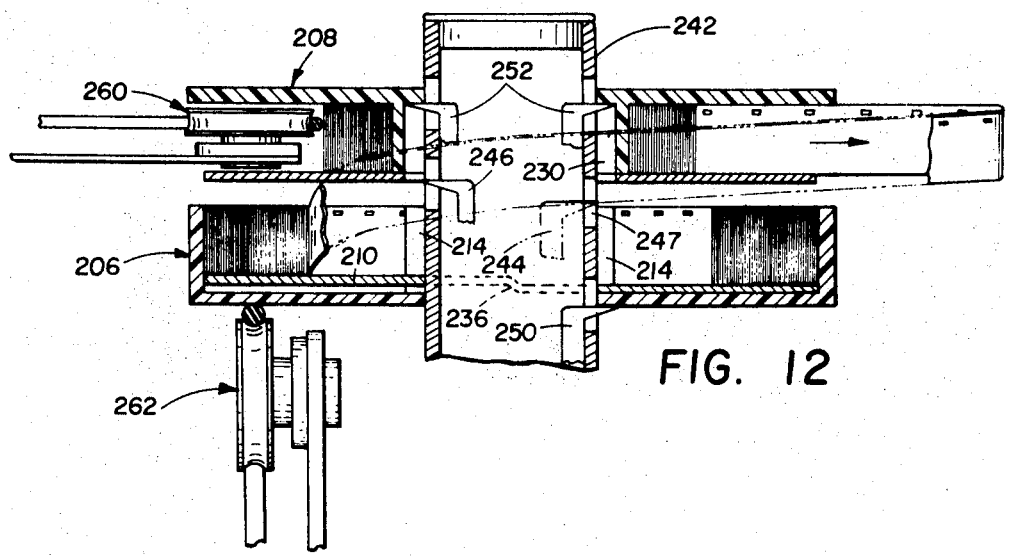
FIG. 12 is a view similar to FIG. 11 but illustrating the tendency drives of an apparatus that may be used to reversely drive the strip material from the take-up portion to the supply portion of the cartridge.
Figure 13:
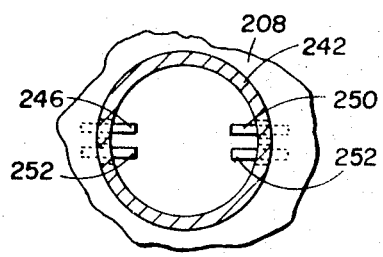
FIG. 13 is a cross-sectional view taken along line 13—13 of FIG. 11.

As the lead portion is being driven out of the cartridge, the cartridge initially is in the collapsed position illustrated in FIG. 6, and may be supported in such position by means of short retractable lugs illustrated in FIGS. 11 and 12, which lugs project radially from spindle 242.

Figure 7:
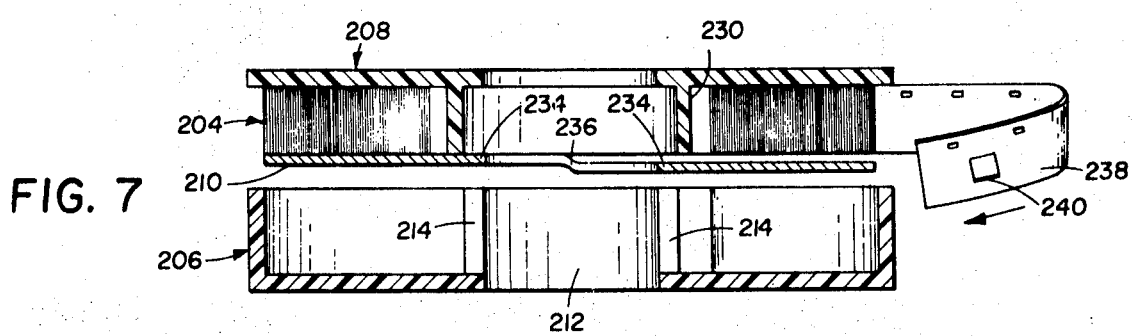
Figure 8:
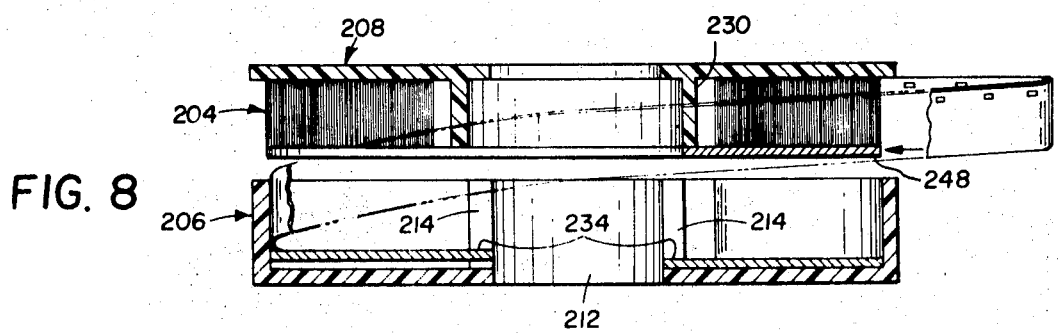

Lug 244, shown in phantom line position in FIG. 11, extends radially through slot 247 in the spindle to support the bottom of the rotatable cup in the collapsed position. Lug 246 moves into position beneath retaining plate 210. After the strip material has been moved out of the cartridge and is being moved in the path of the apparatus, the lug 244 is pivoted out of its supporting relationship with the cup and the cup drops by gravity action to the position shown in FIGS. 7 and 11. Lug 250 is already in position to catch and retain the dropped cup. After the cartridge has been telescopically separated as shown in FIGS. 7 and 11, a support lever 248 is moved by the projector into position beneath the roll 204 of strip material; the offset surface portion of the retaining plate 210 enables the support lever to make its initial entry beneath the roll. After support lever 248 is in position beneath the roll, lug 246 is now pivotally retracted from supporting engagement with the retaining plate 210. The lever 248 is now in supporting relationship with the roll of strip material, and the retaining plate is enabled to drop by gravity action to the bottom of the cup, as shown in FIG. 8. The lead portion 238 of the strip material is guided into the freely rotatable cup or holder 206 by means of the guide arm 251, that is moved by the apparatus into operative relation with the cup, and the lead portion then passes from the channel or chute 255 in the guide arm, radially inwardly of guide pin 253 and around the chamber, subsequently passes radially outwardly of guide pin 253, as shown in FIG. 3, and into the tangential extension where the stop member 220 arrests the lead portion by engagement of lug 222 with the enlarged perforation 240 in the lead portion. The cup is urged into rotation by the arrest of the strip material lead portion, and by cooperation with the guide arm as the cup or holder rotates the entering strip material winds up into convolutions that are located successively radially inwardly of the preceding convolution and of the lead portion 238; thus, the lead portion is outermost and ready for movement from the cartridge again.

Figure 9:
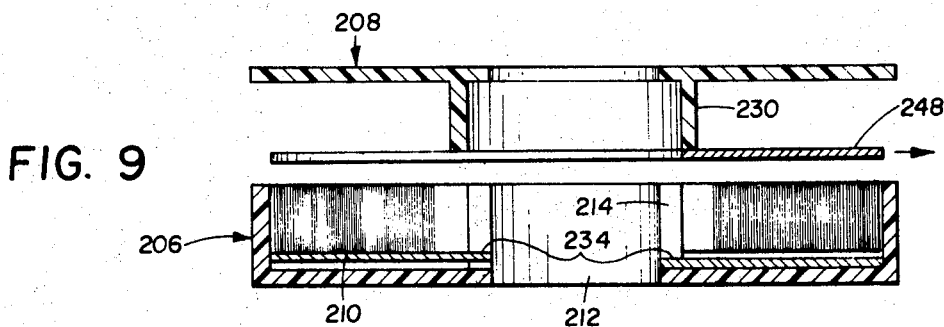
Figure 10:
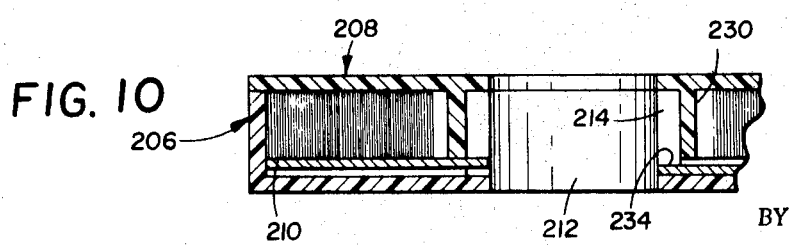

After the strip material has been completely transmitted from the roll, as shown in FIG. 9, the lugs 252 which serve to support the top plate 208 in its raised position, retract and the top plate then drops by gravity action to the collapsed position as shown in FIG. 10. The cartridge is now ready for reprojection and may be either reprojected immediately by suitable mechanism to raise the collapsed cartridge to the position shown in FIG. 6 for subsequent operation in the manner previously described, or may be removed and replaced by another projector cartridge, or may be permitted to drop further down the spindle to make room for another projector cartridge that may be disposed above the spindle ready to drop into operating position. It should, therefore, be apparent that the arrangement disclosed and described is sufficiently versatile so that it can be used with cartridges one at a time or for a series of cartridges in the so-called "juke box" manner.

One advantage that this projector cartridge has is that the lineal speed of the strip material as it passes from the roll of strip material is substantially the same as the lineal speed of the strip material passing into the rotatable cup; thus, there is no speed differential requiring separate drives or clutch mechanisms, and the one advancing mechanism of the apparatus may also provide the power for winding the strip material back into the cartridge.

Obviously also, it should be apparent that instead of the cup telescoping by separating from the roll of strip material in supply form and the top plate, the top plate and such roll could be separated from the cup by being raised upwardly, as viewed in FIG. 7.

An advantage of the disclosed cartridge of FIG. 4 is illustrated in FIG. 12. When it is desired to reverse the direction of the strip material so as to repeat a previous portion of the strip material through the apparatus, tendency drives 260 and 262 from the apparatus may be moved into engagement, respectively, with the roll of strip material in supply form and with the roll of strip material in take-up form.

The embodiment shown in FIGS. 1–13 and described so far relates to a telescoping cartridge whereby the roll of flexible strip material in supply form may be temporarily separated from the rotatable cup. This capability is provided for the purpose of enabling the strip material, as it re-enters the cartridge, to clear the wall of the cup and the preceding convolutions that have already entered the cup. In the embodiment of the invention to be hereinafter described, the path of the apparatus on which the cartridge is to be mounted is arranged so that such path serves to provide the necessary clearance and thereby to enable the cartridge to remain in a collapsed or non-telescoped configuration. In this second embodiment, the re-entering leading end of the strip passes radially inwardly of the upstanding side wall of the cup, but radially outwardly of the supply roll. As additional convolutions are formed in the take-up roll, they accumulate on the inside of the preceding convolution. It is, therefore, only necessary to provide for sufficient clearance between the outermost convolution of the roll in supply form and the inside peripheral wall of the cup or holder so as to enable the lead end of the strip to re-enter freely within such clearance.

Referring to FIGS. 14–16, a projector cartridge 300 is adapted to carry a strip 302 of flexible material having a leading end 304 and a trailing end 306, the trailing end being provided with a diagonal slot 308.

Cartridge 300 is formed by a top plate 310, a cup or holder 312, and a core 314. The top plate, core and cup are held together by suitable means such as molded retaining fingers or lugs 316 which extend radially outwardly at the upper and lower ends of core 314, the dimension and shape of lugs 316 being such that core 314 may be pressed through a hole 318 in top plate 310 and through a hub 320 in holder 312. Core 314 has a recess 322 on its periphery or outer surface in which a film pick-up segment 324 fits. Segment 324 is pivotally mounted on core 314 at 326. The function and operation of segment 324 will be explained in detail hereinafter.

Rotatable cup or holder 312 has, as was mentioned earlier, an integrally formed hub 320. A tangential extention 327 defines a passageway 328 leading to an exit slot 330. As in the hereinbefore described embodiment, a pivotally mounted, spring-biased stop member 332 has a lug 334 and is pivotally mounted in passageway 328 by means of a pin 336 which passes through hole 338. Stop member 332 is biased in a counterclockwise direction, as viewed in FIG. 15, by a spring 340 so that lug 334 will extend through an aperture 342 across passageway 328. Holder 312 has an upstanding wall member 344 and a depending annular ring 346.

Top plate 310 is formed with an opening 348 through which film may be stripped from cartridge 300. Opening 348 is covered by a raised portion or chute 350. A second opening 352 is formed in top plate 310 and is spaced circumferentially from opening 348. As will be described hereinafter, opening 352 provides access to the interior of cartridge 300 for feeding the lead end of film 302 back into the cartridge. A lug 354 is formed on the top surface of plate 310 for orientation purposes.

In operation, cartridge 300 is placed on a strip material advancing apparatus (not shown) with the lead end 304 of strip material 302 releasably engaged by lug 334 of stop member 332 through an enlarged perforation 356 in the lead end of the strip material. Lug 334 holds lead end 304 within passageway 328 in tangential extension 327 of the cartridge.

Cartridge 300 may be easily mounted on a spindle which extends through core 314. A puck drive member (not shown) of the apparatus may extend through aperture 342 tangential extension 326 to pivot stop member 332 in a clockwise direction, as viewed in FIG. 15, and thus, release lug 334 of stop member 332 from enlarged perforation 356 of lead end 304, whereupon the lead end is driven out of exit slot 330 of the cartridge.

Although apparatus is not specifically shown for use with the cartridge of this invention, it will be appreciated that it is well known to provide a suitable guide path in projectors and similar apparatus for strip material until such time as the strip material advancing mechanism (not shown) of the apparatus engages the strip material for subsequent advancement past a sound head or film gate, or whatever the operating station may be. When such advancing mechanism does so engage the advancing material, the puck drive member referred to above would be retracted from its driving engagement with the strip material through aperture 342 of the cartridge tangential extension 327.

Before the film is driven from cartridge 300, a second puck drive member first engages the rim of top plate 310, rotating the top plate with respect to holder 312 until lug 354 engages a corresponding member (not shown) in the apparatus, thus, orienting top plate 310 so that chute 350 is above the path of the film withdrawal and so that opening 352 is in correct position for re-entry of film into the cartridge. As top plate 310 reaches the stopped position, the rim-drive puck member enters the rimless portion under chute 350 to allow a second coaxially aligned puck (not shown) to enter aperture 342 and eject the film lead end 304 as discussed hereinbefore.

As lead end 304 reaches the strip material advancing mechanism of the apparatus, the coaxial drive puck members are disengaged and the cartridge is lowered in the apparatus a distance about equal to the height of wall 344. Alternatively, the film and projector film path may be raised above the cartridge while the cartridge is left in its original plane. The apparatus directs end 304 of strip material 302 back into the cartridge from the top through opening 352, against the inner surface of wall 344. The incoming film travels around the inner surface of wall 344 until it enters passageway 328 of tangential extension 327 where it is stopped by stop member 332.

The lowering of cartridge 310 on the apparatus as discussed above disengages cup 312 from the orienting restraint of the adjacent part of the apparatus. Annular ring 346 on the lower surface of cup 312 cooperates with a mating ring on the apparatus so that clearance is maintained between adjacent cylindrical surfaces of cup 312 and core 314, thus reducing friction and avoiding drive-tendency due to relative motion of cup and core. The cup, now being free to move, is rotated clockwise as seen in FIG. 15 by the advancing film which accumulates in successive convolutions inwardly from wall 344. If required because of stiffness of the film or the mass of the film roll, a tendency drive may be applied to cup 312 by any appropriate means.

The strip material is continued to be drawn through chute 350 until trailing end 306 is pulled from cartridge 300. After the trailing end has passed the projection apparatus and has been returned to the cartridge through opening 352, a rewind switch in the apparatus is actuated so that mechanism (not shown) within the projector spindle engages the inner wall of core 314 to drive the core in a counterclockwise direction. Pick-up segment 324 of core 314 pivots outwardly about its axis by centrifugal force so that a hook 355 thereon engages diagonal slot 308 in the trailing end of film 302. The slope of slot 308 brings the lower edge of film 302 into alignment with the lower surface of core 314 in the bottom of cup 312. As core 314 rotates in a counterclockwise direction, film 302 is wound into a compact roll about the core. When the lead end of the film is drawn taut against lug 334, cup 312 is caused to rotate counterclockwise and to engage a switch (not shown) which re-establishes the cup in insertion orientation, discontinues rewind, and raises the cartridge to insertion position on the spindle. The projection cycle is now complete, and the projector is ready to repeat the sequence upon actuation of a projector switch.

It should be apparent that if the strip material should not have sufficient rigidity to drive in rotation the rotatable cup or holder, such as may be true of magnetic tape, then it would be within the skill of the art to provide a separate drive for the rotatable cup.

The invention has been described in detail with particular reference to preferred embodiments thereof, but it will be understood that variations and modifications can be effected within the spirit and scope of the invention.

I claim:

1. A non-rewind cartridge for use on an apparatus and adapted to receive a roll of strip material having a lead portion, said cartridge comprising:
a holder for receiving a roll of strip material with the lead portion of the strip material being outermost on the roll;
means for supporting said roll of strip material in roll form, said support means being separable from said holder for removing said roll from said holder when said cartridge is on the apparatus and comprising a first portion upon which said roll is formed and a second portion separable from said first portion and adapted to be returned to said holder so that the strip material on said holder can be stripped from said first portion, moved through said apparatus, returned to the cartridge and wound inwardly into a roll in the holder on said second portion with the lead portion of the strip material again being outermost on the roll.

2. A strip materal non-rewind cartridge for use on an apparatus and adapted to receive a roll of strip material having a lead portion, said carriage comprising:
a holder for receiving a roll of strip material with the lead portion of the strip material being outermost on the roll, said holder having an axis corresponding to the axis of rotation of a received roll; and
means for supporting said roll of strip material in roll form, said supporting means comprising a retaining plate in a coaxial alignment with said holder and adapted to be axially movable relative to said holder, said supporting means further being separable from said holder for removing said roll from said holder when said cartridge is on the apparatus, so that the strip material on said roll can be stripped from said roll, moved through said apparatus, returned to the cartridge and wound inwardly into a roll in the holder with the lead portion of the strip material again being outermost on the roll.

3. A strip material non-rewind cartridge for use on an apparatus and adapted to receive a roll of strip material having a lead portion, said cartridge comprising:
a holder for receiving a roll of strip material with the lead portion of the strip material being outermost on the roll, said holder being rotatable and said roll of strip material in supply form being disposed within said rotatable holder; and
means for supporting said roll of strip material in roll form, said support means being separable from said holder for removing said roll from said holder when said cartridge is on the apparatus, so that the strip material on said roll can be stripped from said roll, moved through said apparatus, returned to the cartridgfie and wound inwardly into a roll in the holder with the lead portion of the strip material again being outermost on the roll, and said lead portion in returning to the cartridge being adapted to pass into said rotatable holder radially outwardly of said roll in supply form in concentric relation with said roll, with the convolutions of incoming strip material being formed radially inwardly of said lead portion and radially outwardly of said roll.

4. A strip material non-rewind cartridge for use on an apparatus and adapted to receive a roll of strip material, said cartridge comprising:
a top plate; and
a rotatable holder that is freely rotatable relative to and connected to said top plate, said holder defining a cavity for receiving the roll and having a tangential extension defining a passageway and exit slot from said cavity for a lead portion of the roll of strip material;
means extending across said passageway in said tangential extension for releasably holding the lead portion of the roll of strip material in said passageway.

5. A strip material non-rewind cartridge as defined in claim 4 wherein said means for holding the lead portion of the roll comprises a pivotally mounted stop member having a lug that is adapted to extend through an enlarged perforation at one end of said lead portion.

6. A strip material non-rewind cartridge as defined in claim 4, wherein said rotatable holder and said top plate are adapted to be telescopically separable from each other during operation on said apparatus.

7. A cartridge for a strip of flexible material having a lead end and a trailing end, said cartridge comprising:
a core having an outer surface, said outer surface having means for receiving the trailing end of a strip of flexible material whereby the strip can be wound in convolutions about said core in the form of a compact supply roll;
a ring having an inner surface, said inner surface having means for receiving the lead end of a strip of flexible material whereby the strip can be wound against said inner surface such that the strip accumulates in successive convolutions radially inwardly from said inner surface;
means for concentrically connecting said core to said ring such that said core of said ring are rotatable relative to one another about a common axis, whereby said outer and inner surfaces define therebetween a chamber; and
means defining at least one opening in said chamber through which the strip may be fed from a supply roll wound on said core, out of said chamber, and back into said chamber so that the lead end is received by said inner surface, whereby the strip accumulates in successive convolutions radially inwardly from said inner surface and radially outwardly of any remaining portion of the supply roll.

8. A cartridge as defined in claim 7 wherein said means on said core for receiving the trailing end of the strip is adapted to engage the trailing end after the film has reentered the cartridge.

9. A cartridge for a strip of flexible material having a lead end and a trailing end, said cartridge comprising:
a plate;
a wall member on said plate, said wall member including a substantially cylindrical inner surface having means for engaging the lead end of a strip of flexible material whereby the strip can be wound on said plate against said inner surface such that the strip accumulates in sucessive convolutions radially inwardly from said inner surface in a predetermined circumferential direction to form a take-up roll;
a core mounted on said plate concentric with, and rotatable relative to, said inner surface of said wall member, said core having an outer surface with means for receiving the trailing end of a strip of flexible material, whereby the strip can be wound in successive convolutions radially outwardly from said outer surface in a circumferential direction opposite to said predetermined direction to form a supply roll; and
means defining at least one opening in said cartridge through which the strip may be fed from a supply roll wound on said outer surface, out of said cartridge, and back into said cartridge so that the lead end is received by said engaging means, whereby successive convolutions of the strip accumulate radially inwardly of said inner surface and radially outwardly of any remaining portion of said supply roll to form a take-up roll.

10. A cartridge as defined in claim 9 wherein said means for receiving the trailing end of a strip includes means for engaging the trailing end after the film has reentered the cartridge as said core is rotated relative to said wall member in a direction opposite to said predetermined circumferential direction, whereby the strip is compactly wound about said outer surface.

11. A cartridge as defined in claim 10 wherein said means for engaging the trailing end of a strip comprises a segment of said outer surface which is pivotally connected to said core to move radially outwardly into contact with the inner convolution of the take-up roll as said core is rotated, 12. A cartridge as defined in claim 9 further comprising a second plate substantially parallel to, and on the opposite side of said core from, said first mentioned plate, said second plate defining a strip feeding opening through which the strip may be drawn from the supply roll and a strip receiving opening through which the strip may be returned to the take-up roll.

13. A cartridge as defined in claim 9 further comprising:
an exit slot in said wall member through which the lead end of the strip may be drawn from the supply roll; and
a second plate substantially parallel to, and on the opposite side of said core from, said first mentioned plate, said second plate defining a strip feeding opening locatable over said slot through which the strip may be drawn from the supply roll after the lead end has been drawn through said slot.

14. A mechanism for winding a strip of flexible material, said mechanism comprising:
a wall member including a substantially cylindrical inner surface having means for engaging one of the ends of a strip of flexible material whereby the strip can be wound against said inner surface such that the strip accumulates in successive convolutions radially inwardly from said inner surface in a predetermined circumferential direction to form an outer roll associated with said inner surface;
a core having an outer surface concentric with and rotatable relative to said inner surface of said wall member, said outer surface including means for receiving the other end of a strip of flexible material whereby the strip can be wound in successsive convolutions radially outwardly from said outer surface in a circumferential direction opposite to said predetermined direction to form an inner roll associated with said outer surface; and
opening means in said mechanism through which the strip of flexible material may be fed from one of the rolls, out of said mechanism, and back into said mechanism so that the leading end is received by the surface associated with the other roll.

15. In a strip material non-rewind cartridge for use on an apparatus and adapted to receive a roll of strip material, the combination comprising:
a rotatable holder into which said strip material may be wound internally as the holder is rotated with the lead portion of the strip material being outermost on the roll, said roll of strip material in supply form being disposed within said rotatable holder; and
means for holding said roll of strip material in supply form so that the strip material on said roll is adapted to be stripped out of the cartridge, moved through a path of said apparatus and in return to the cartridge and into said rotatable holder radially outwardly of said roll in supply form in concentric relation with said roll, with the convolutions of incoming strip material being formed radially inwardly of said lead portion and radially outwardly of said roll.

References Cited
UNITED STATES PATENTS

| | | | |
|---|---|---|---|
| 1,119,489 | 12/1914 | Bingham | 242—55.21 |
| 1,134,664 | 4/1915 | Bingham | 242—55.21 |
| 1,177,985 | 4/1916 | Boege | 242—55.21 |
| 3,292,875 | 12/1966 | Rojic | 242—55.21 |
| 3,388,873 | 6/1968 | Rosenbaum | 242—55.21 |

LEONARD D. CHRISTIAN, Primary Examiner

U.S. Cl. X.R.

352—128